US012745128B2

(12) United States Patent
Khafizov et al.

(10) Patent No.: US 12,745,128 B2
(45) Date of Patent: Sep. 22, 2026

(54) SYSTEMS AND METHODS FOR AUTOMATICALLY UPDATING RADIO ACCESS NETWORK CONFIGURATIONS IN CASE OF PREDICTED SERVICE DEGRADATION

(71) Applicant: Verizon Patent and Licensing Inc., Basking Ridge, NJ (US)

(72) Inventors: Farid Khafizov, Plano, TX (US); Sachin Vargantwar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 18/676,833

(22) Filed: May 29, 2024

(65) Prior Publication Data

US 2025/0374115 A1 Dec. 4, 2025

(51) Int. Cl.
*H04W 28/02* (2009.01)

(52) U.S. Cl.
CPC ... *H04W 28/0273* (2013.01); *H04W 28/0263* (2013.01); *H04W 28/0284* (2013.01)

(58) Field of Classification Search
CPC ......... H04W 28/0273; H04W 28/0263; H04W 28/0284
See application file for complete search history.

(56) References Cited

U.S. PATENT DOCUMENTS

2025/0016678 A1 * 1/2025 Liu ................... H04W 52/0251

FOREIGN PATENT DOCUMENTS

| | | | |
|---|---|---|---|
| WO | WO-2022074015 A1 * | 4/2022 | ............. G06N 3/045 |
| WO | WO-2022260459 A1 * | 12/2022 | ............ H04W 76/30 |
| WO | WO-2023087138 A1 * | 5/2023 | ............ H04W 52/02 |
| WO | WO-2023156000 A1 * | 8/2023 | ............. G06N 20/00 |
| WO | WO-2024113367 A1 * | 6/2024 | ............ H04W 24/02 |

* cited by examiner

*Primary Examiner* — Afshawn M Towfighi

(57) ABSTRACT

A device may receive topology data associated with a plurality of RANs and historical energy consumption data associated with respective radios of the plurality of RANs, and may generate feature data identifying features. The device may process the feature data to generate a trained predictive model, and may receive traffic associated with the plurality of RANs and current energy consumption data associated with the respective radios. The device may create a network data flow graph of the plurality of RANs or the respective radios based on the traffic and the current energy consumption data. The device may process the network data flow graph, with the trained predictive model, to determine energy consumption drops of the respective radios and corresponding KPI degradations of the respective radios. The device may identify a radio with an energy consumption drop above a predefined threshold, and may perform one or more actions for the radio.

20 Claims, 10 Drawing Sheets

SYSTEMS AND METHODS FOR AUTOMATICALLY UPDATING RADIO ACCESS NETWORK CONFIGURATIONS IN CASE OF PREDICTED SERVICE DEGRADATION

BACKGROUND

In the field of telecommunications, particularly regarding radio access networks (RAN), maintaining consistent and high-quality service is paramount. Ensuring minimal service degradation, which can manifest through reduced data throughput, voice call drops, poor voice quality, or other disruptions, is a significant challenge for network providers.

DETAILED DESCRIPTION OF EXAMPLE EMBODIMENTS

Figure 1A:
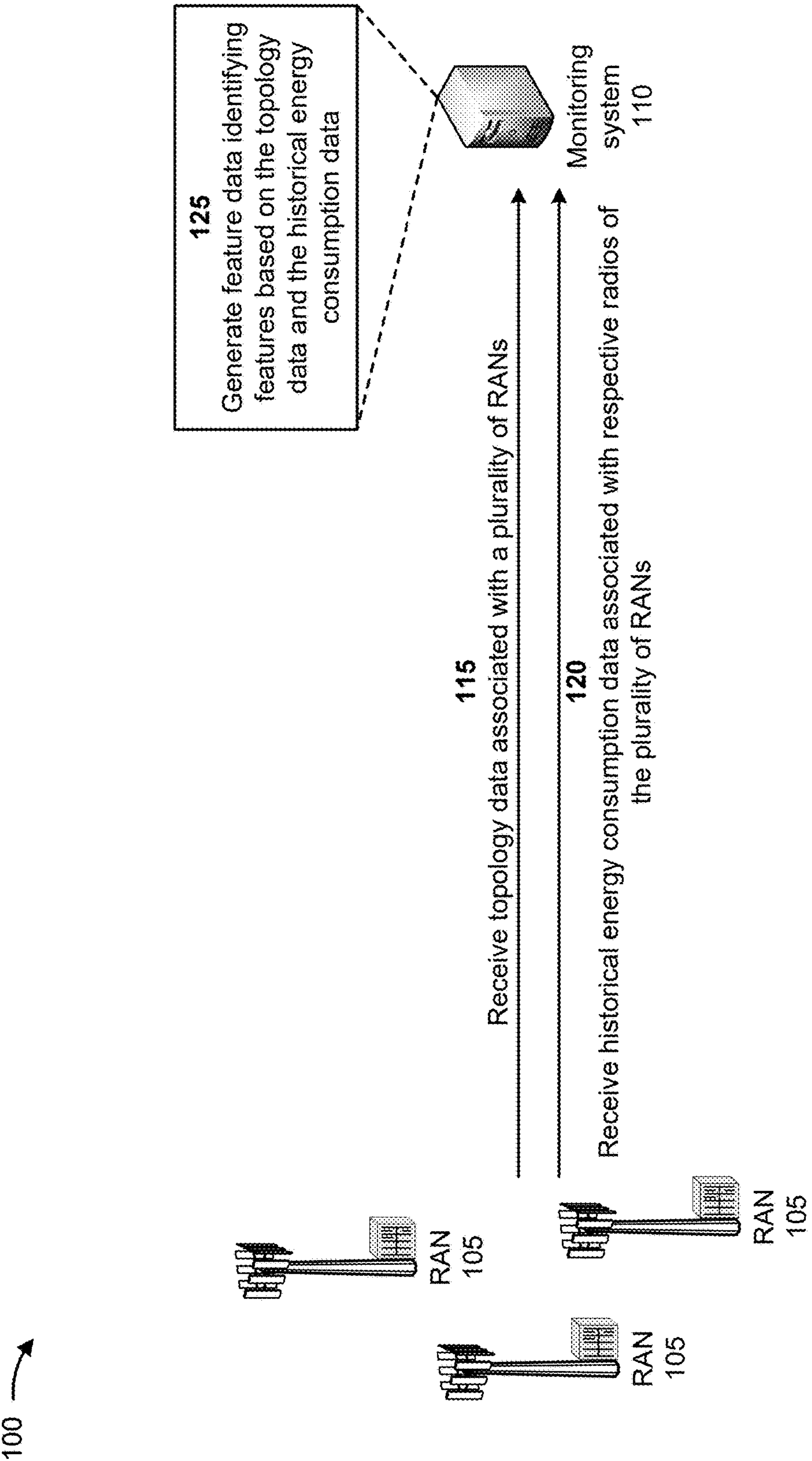
FIGS. 1A-1F are diagrams of an example associated with automatically updating RAN configurations in case of likely service degradation.

The following detailed description of example implementations refers to the accompanying drawings. The same reference numbers in different drawings may identify the same or similar elements.

Service degradation in radios of RANs can often be recognized by a drop in energy consumption patterns, as a radio in standard operation exhibits consistent energy usage. However, deviations from a norm are strong indicators of potential problems, and early detection of the potential problems is crucial for maintaining service integrity. This task is complicated by the reactive nature of current techniques that deal only with issues after service has already suffered, and which are typically manual, difficult to scale, and insufficiently proactive. Radio failures necessitate timely, efficient, and preemptive responses to forecast and mitigate potential lapses in service. The potential problems further extend to the complexities involved in managing and adjusting the configurations of neighboring sites to compensate for compromised radios. Presently, this adjustment process is manual and cannot be easily scaled, particularly in the face of significant outages. Adjustment of configurations also often occurs too late, when the service quality has already deteriorated, which can lead to a suboptimal user experience.

Thus, current techniques for preventing service degradation in RANs consume computing resources (e.g., processing resources, memory resources, communication resources, and/or the like), networking resources, and/or other resources associated with handling poor end user experience associated with service degradation in RANs, failing to address the service degradation in the RANs in a timely manner resulting in service outages, handling lost traffic associated with the service degradation in the RANs, and/or the like.

Some implementations described herein provide a monitoring system that automatically updates RAN configurations in case of likely service degradation. For example, the monitoring system may receive topology data associated with a plurality of RANs and historical energy consumption data associated with respective radios of the plurality of RANs, and may generate feature data identifying features based on the topology data and the historical energy consumption data. The monitoring system may process the feature data, with a predictive model, to generate a trained predictive model that predicts energy consumption drops of the respective radios and corresponding key performance indicator (KPI) degradations, and may receive traffic associated with the plurality of RANs and current energy consumption data associated with the respective radios of the plurality of RANs. The monitoring system may create a network data flow graph of the plurality of RANs or the respective radios of the plurality of RANs based on the traffic and the current energy consumption data, and may process the network data flow graph, with the trained predictive model, to determine energy consumption drops of the respective radios and corresponding KPI degradations of the respective radios. The monitoring system may identify a radio of the respective radios and with an energy consumption drop above a predefined threshold, and may determine, based on a KPI degradation of the radio, a configuration update for the radio to minimize impact to end users associated with the radio. The monitoring system may cause the configuration update to be installed on the radio.

In this way, the monitoring system automatically updates RAN configurations in cases of likely service degradation. For example, the monitoring system may provide a proactive, automated system for mitigating potential service degradation in RANs due to radio failures. The monitoring system may monitor energy consumption patterns of radios, and may generate a connectivity graph for the RANs. The monitoring system may apply a predictive machine learning model to anticipate energy drops, and may adjust network parameters to reroute traffic and avert service disruption. In some aspects, the monitoring system may collect historical incident data and KPIs, and may apply preventive maintenance procedures for the radios and/or the RANs. The monitoring system addresses the problem of reacting too late to service degradation by utilizing energy consumption patterns as an early warning sign. This allows the monitoring system to proactively manage resource allocation and reroute traffic to preserve the integrity of RAN performance. By adjusting operational parameters, such as handover thresholds, the monitoring system optimizes load distribution to reduce the impact on RAN resources due to potential radio failures. Additionally, the monitoring system may utilize machine learning model recalibration based on actual energy consumption post-prediction, thereby enhancing predictive accuracy and conserving RAN resources through more precise anticipatory actions.

Thus, the monitoring system may conserve computing resources, networking resources, and/or other resources that would have otherwise been consumed by handling poor end user experience associated with service degradation in RANs, failing to address the service degradation in the RANs in a timely manner resulting in service outages, handling lost traffic associated with the service degradation in the RANs, and/or the like, and/or the like.

FIGS. 1A-1F are diagrams of an example 100 associated with automatically updating RAN configurations in case of likely service degradation. As shown in FIGS. 1A-1F, example 100 includes a plurality of RANs 105 associated with a monitoring system 110. Further details of the plurality of RANs 105 and the monitoring system 110 are provided elsewhere herein.

As shown in FIG. 1A, and by reference number 115, the monitoring system 110 may receive topology data associated with the plurality of RANs 105. For example, the monitoring system 110 may receive the topology data from the plurality of RANs 105, from a network planning system associated with the plurality of RANs 105, and/or the like. The topology data may include data associated with a layout and interconnected relationships of the plurality of RANs 105. For example, topology data may include data identifying locations of the plurality of RANs 105, connectivity between the plurality of RANs 105, dates of manufacturing of the plurality of RANs 105, a quantity and types of previous incidents experienced by the plurality of RANs 105, historical traffic loads at the plurality of RANs 105, and other structural details that are essential for understanding a network architecture of the plurality of RANs 105. In some implementations, the monitoring system 110 may utilize the topology data to assess network performance and identify patterns that might indicate potential service degradation, thereby facilitating proactive measures. The monitoring system 110 may periodically receive the topology data from the plurality of RANs 105, may continuously receive the topology data from the plurality of RANs 105, may receive the topology data from the plurality of RANs 105 based on requesting the topology data, and/or the like.

As further shown in FIG. 1A, and by reference number 120, the monitoring system 110 may receive historical energy consumption data associated with respective radios of the plurality of RANs 105. For example, each of the plurality of RANs 105 may include multiple radios that generate the historical energy consumption data over a past time period. The monitoring system 110 may periodically receive the historical energy consumption data from the respective radios of the plurality of RANs 105, may continuously receive the historical energy consumption data from the respective radios of the plurality of RANs 105, may receive the historical energy consumption data from the respective radios of the plurality of RANs 105 based on requesting the historical energy consumption data, and/or the like. The historical energy consumption data may include data identifying periodic (e.g., hourly) energy consumption per radio or per RAN 105, KPIs associated with energy consumption per radio or per RAN 105, and/or the like. The historical energy consumption data may enable the monitoring system 110 to establish a baseline for normal operational energy levels, thereby enabling the monitoring system 110 to detect any deviations that might suggest impending radio failures or service degradation. The historical energy consumption data may also enable a predictive model, utilized by the monitoring system 110 and described below, to correlate past events with energy consumption anomalies and enhance predictive accuracy.

As further shown in FIG. 1A, and by reference number 125, the monitoring system 110 may generate feature data identifying features based on the topology data and the historical energy consumption data. For example, the monitoring system 110 may utilize the topology data and the historical energy consumption data as features for the predictive model. In some implementations, the monitoring system 110 may extract the features from the topology data and the historical energy consumption data to generate the feature data. The feature extraction may include the monitoring system 110 distilling the topology data and the historical energy consumption data into a set of definable characteristics or features, such as patterns of energy usage, traffic flow, signal quality, and/or the like. The features may include statistics, such as periodic (e.g., hourly) energy use per radio, a volume of handoff traffic between RANs 105, historical performance of the radios under various traffic load conditions, and/or the like.

In some implementations, the monitoring system 110 may utilize the extracted features to train the predictive model to accurately predict energy consumption drops and corresponding KPI degradations. The accurately predicted energy consumption drops and corresponding KPI degradations may be utilized by network engineers to pre-emptively address issues, thereby enhancing the reliability of the RANs 105 and user satisfaction. Additionally, the monitoring system 110 may utilize the accurately predicted energy consumption drops and corresponding KPI degradations to provide recommendations or trigger automatic configuration updates to reduce loads on at-risk radios or RANs 105, as described below.

Figure 1B:
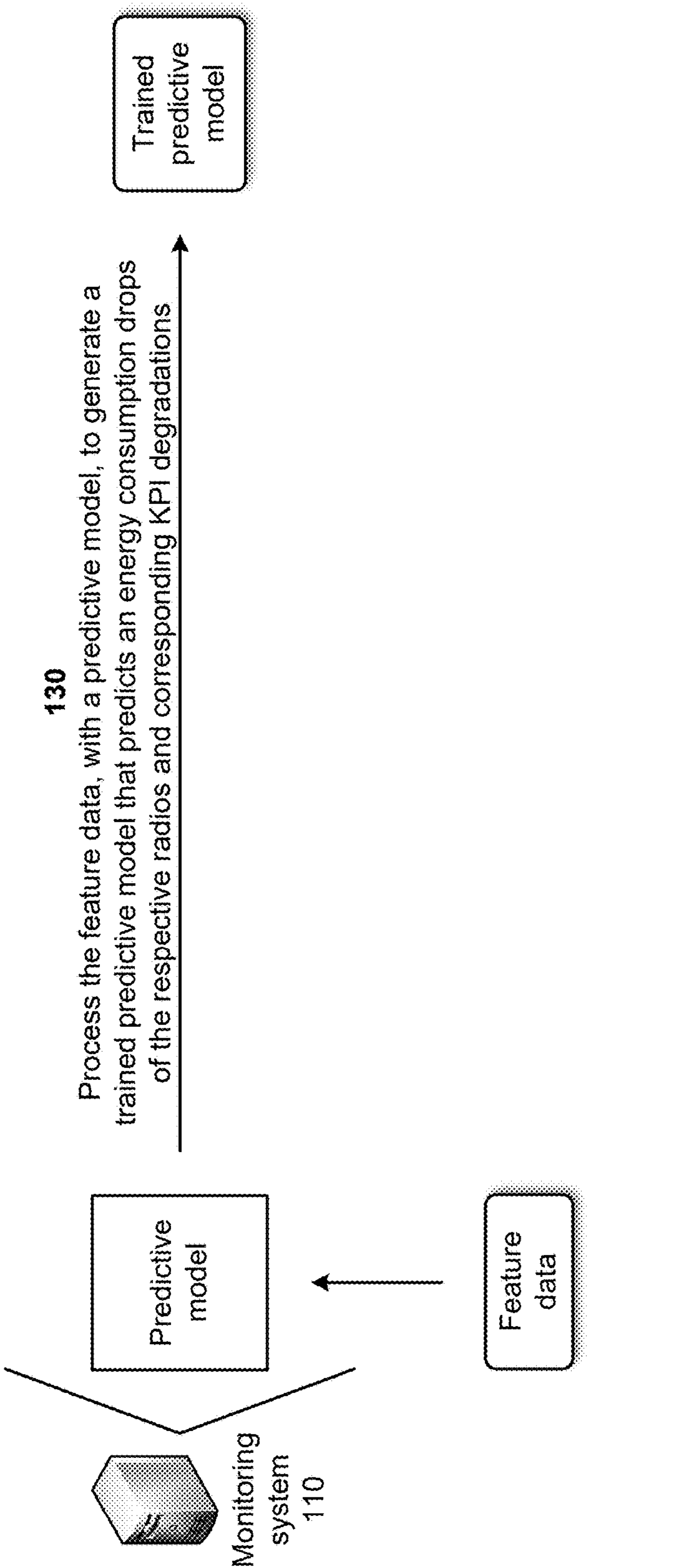

As shown in FIG. 1B, and by reference number 130, the monitoring system 110 may process the feature data, with a predictive model, to generate a trained predictive model that predicts energy consumption drops of the respective radios and corresponding KPI degradations. For example, the monitoring system 110 may be associated with a predictive model, such as a predictive regression model or a binary classification model. The monitoring system 110 may employ advanced computational techniques to analyze the feature data (e.g., derived from the topology data and the historical energy consumption data) using the predictive model. The monitoring system 110 may train the predictive model to produce a predictive model that is trained specifically to forecast potential future decreases in energy usage of the radios or the RANs 105. The energy consumption drops of the respective radios and the corresponding KPI degradations generated by the trained predictive model may provide indications of potential service degradation events within the RANs 105. The trained predictive model may output information that associates projected energy consumption drops with potential drops in KPIs, which may directly impact user experience.

In some implementations, the predictive model may include a variety of machine learning approaches, potentially ranging from ensemble methods to deep learning architectures. By processing the feature data with the predictive model, the monitoring system 110 may effectively convert raw data into actionable insights, and may predict not just energy drops but also how those energy drops may correlate with KPI degradations that have real-world consequences for network efficiency and customer service quality. By anticipating points of failure before they occur, the monitoring system 110 may implement preemptive measures to reroute traffic, perform proactive maintenance, adjust network configuration, and/or the like, to minimize service interruptions.

In some implementations, the monitoring system 110 may retrain the predictive model based on post-prediction analysis of actual energy consumption by the radios. This retraining may include a feedback loop that continuously improves the accuracy and reliability of the predictive model, leading to more effective predictions over time. In some implementations, the monitoring system 110 may process the feature data at predetermined intervals or upon detection of specific network events, thereby ensuring that the trained predictive model remains current with the constantly evolving traffic patterns and energy consumption profiles of the RANs 105. The monitoring system 110 also may simulate potential traffic scenarios to further refine predictive accuracy of the predictive model and rerouting strategies for network traffic.

Figure 1C:
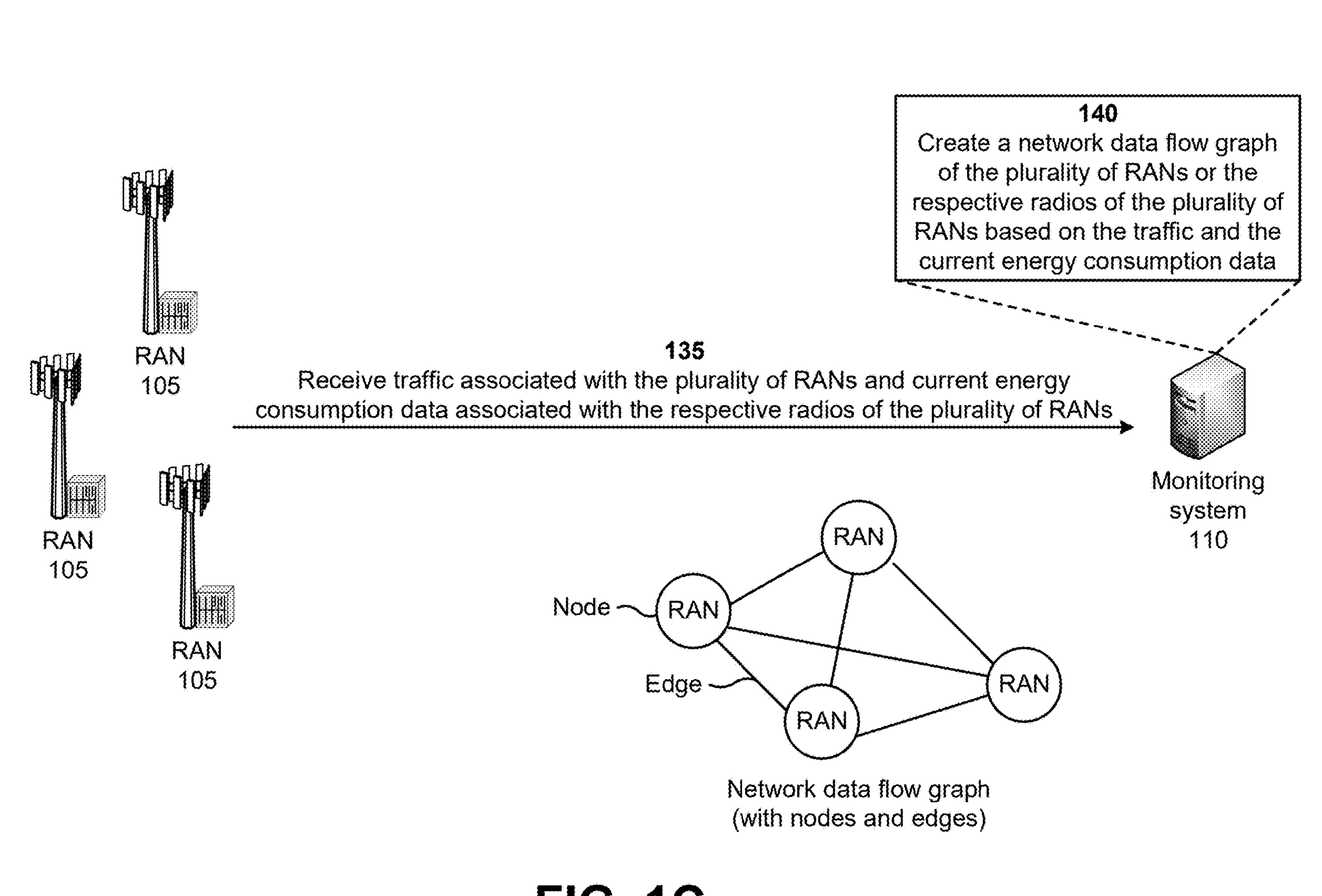

As shown in FIG. 1C, and by reference number 135, the monitoring system 110 may receive traffic associated with the plurality of RANs 105 and current energy consumption data associated with the respective radios of the plurality of RANs 105. For example, after training the predictive model, the monitoring system 110 may receive, from the plurality of RANs 105, the traffic associated with the plurality of RANs 105 and the current energy consumption data associated with the respective radios of the plurality of RANs 105. The monitoring system 110 may periodically receive the traffic and the current energy consumption data from the plurality of RANs 105, may continuously receive the traffic and the current energy consumption data from the plurality of RANs 105, may receive the traffic and the current energy consumption data from the plurality of RANs 105 based on requesting the traffic and the current energy consumption data, and/or the like.

The traffic may include data identifying traffic volumes, types of data being exchanged between the RANs 105, time stamps representing when the data is received, and/or the like. The current energy consumption data may include data identifying current energy consumption per radio or per RAN 105, KPIs associated with energy consumption per radio or per RAN 105, and/or the like. Acquisition of the traffic and the current energy consumption data may ensure that the monitoring system 110 is constantly updated with the most recent traffic and energy consumption metrics for analysis.

As further shown in FIG. 1C, and by reference number 140, the monitoring system 110 may create a network data flow graph of the plurality of RANs 105 or the respective radios of the plurality of RANs 105 based on the traffic and the current energy consumption data. For example, the monitoring system 110 may utilize the traffic and the current energy consumption data to create a knowledge graph (e.g., a network data flow graph) representing data flows associated with the plurality of RANs 105 or the respective radios of the plurality of RANs 105. In some implementations, when creating the network data flow graph of the plurality of RANs 105 or the respective radios of the plurality of RANs 105, the monitoring system 110 may generate nodes representing the plurality of RANs 105 or the respective radios, and may generate edges between the nodes and representing traffic flow between the nodes. The monitoring system 110 may assign weight values to the edges based on traffic volume. The network data flow graph may provide a visualization of traffic patterns and energy usage across the network of RANs 105, which may aid in predictive modeling and may enable responsive network configuration management aimed at minimizing service degradation potentially caused by failing radios.

In some implementations, the monitoring system 110 may create a network data flow graph that reflects real-time conditions and is configured for continuous updates, thereby enabling responsive adjustments to network traffic routing and facilitating maintenance scheduling. The real-time conditions and continuous updates may enable predictive and proactive management of the RANs 105 and corresponding radios, contributing to enhanced reliability and customer satisfaction through improved maintenance.

Figure 1D:
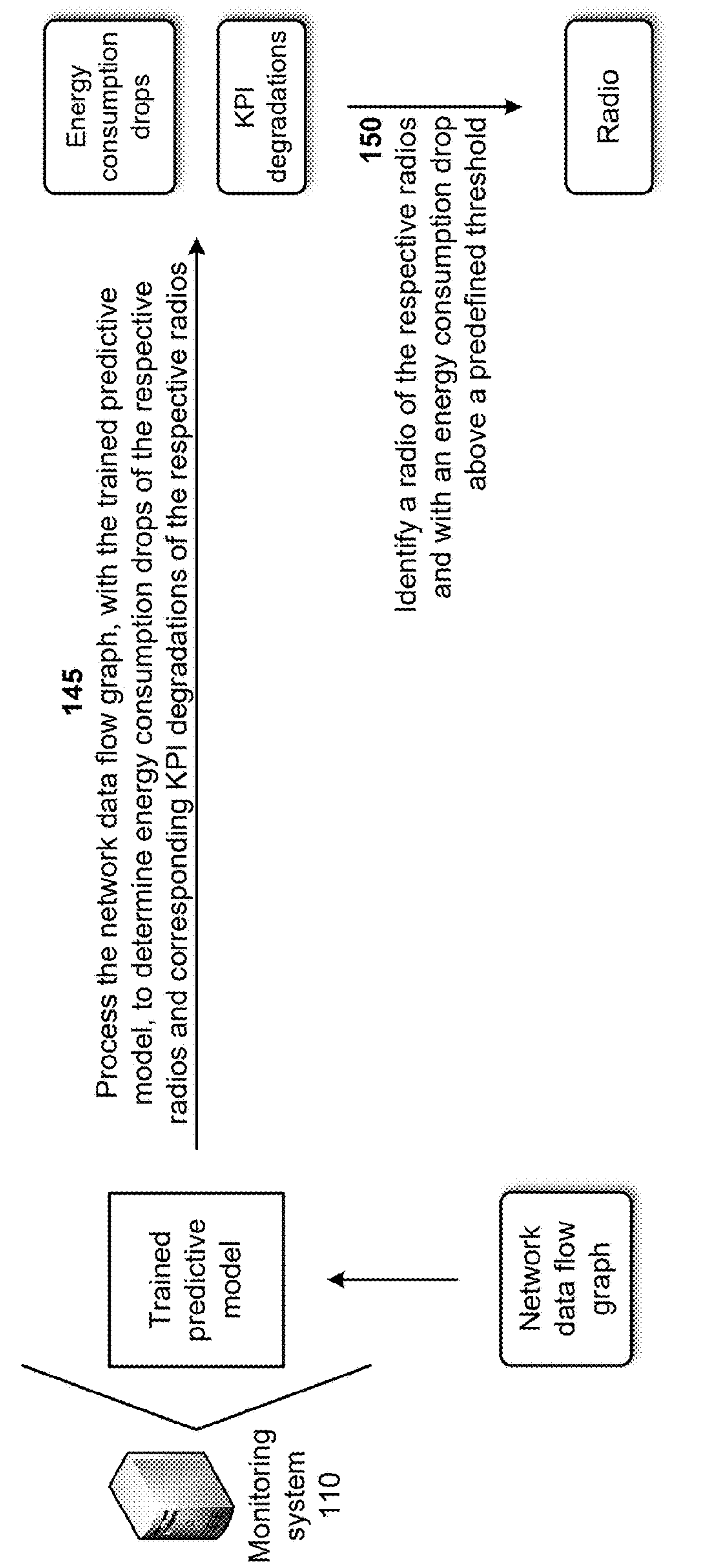

As shown in FIG. 1D, and by reference number 145, the monitoring system 110 may process the network data flow graph, with the trained predictive model, to determine energy consumption drops of the respective radios and corresponding KPI degradations of the respective radios. For example, the monitoring system 110 may utilize the trained predictive model to determine the energy consumption drops and the corresponding KPI degradations of the respective radios based on the network data flow graph. The trained predictive model may analyze the network data flow graph, and may identify patterns in the network data flow graph that indicate the energy consumption drops and the corresponding KPI degradations based on the analysis. In this way, the monitoring system 110, using the trained predictive model, may proactively identify potential service degradation issues by determining the energy consumption drops and the corresponding KPI degradations.

As further shown in FIG. 1D, and by reference number 150, the monitoring system 110 may identify a radio of the respective radios and with an energy consumption drop above a predefined threshold. For example, the monitoring system 110 may compare the energy consumption drops of the radios with the predefined threshold (e.g., eighty percent, ninety percent, and/or the like, which may be configurable), and may determine whether any of the energy consumption drops of the radios are above the predefined threshold. In some implementations, the monitoring system 110 may determine that one of the energy consumption drops of the radios is above the predefined threshold, and may identify the radio corresponding to the one of the energy consumption drops. Alternatively, the monitoring system 110 may determine that one of the energy consumption drops of the radios is not above the predefined threshold, and may determine that the radio corresponding to the one of the energy consumption drops is not experiencing service degradation.

The identification of a radio with an energy consumption drop above the predefined threshold may enable the monitoring system 110 to pinpoint a specific radio that may likely lead to service degradation. The monitoring system 110 may identify which radio or radios are at risk of service degradation based on the predefined threshold (e.g., which may be modified based on changing network conditions). The predefined threshold may serve as a trigger for further actions, such as configuration updates of radios and/or RANs 105, replacement of radios and/or RANs 105, proactive maintenance of radios and/or RANs 105, and/or recommendations associated with radios and/or RANs 105, which may enhance reliability and user experience associated with the RANs 105.

Figure 1E:
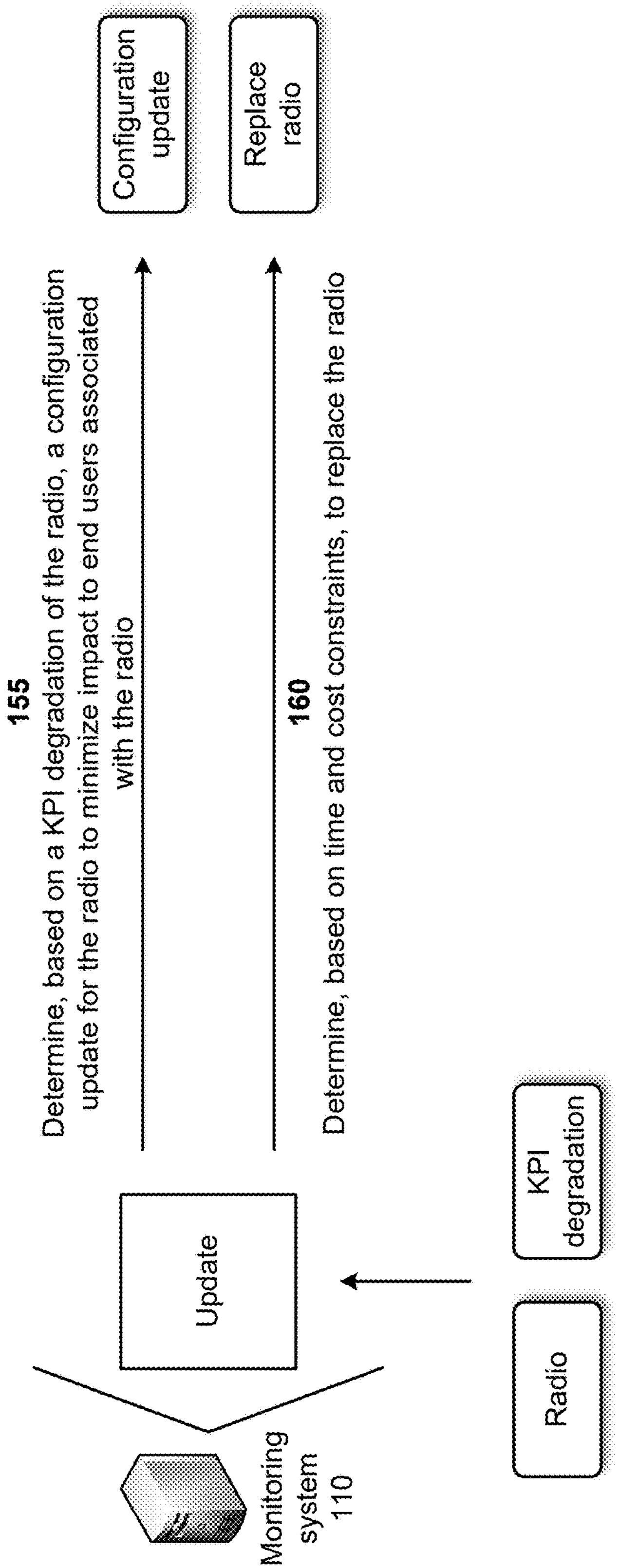

As shown in FIG. 1E, and by reference number 155, the monitoring system 110 may determine, based on a KPI degradation of the radio, a configuration update for the radio to minimize impact to end users associated with the radio. For example, the monitoring system 110 may determine performance metrics (e.g., KPIs) that have degraded for the identified radio, and may utilize the historical energy consumption data and the traffic to determine a most efficient configuration update for the radio. In some implementations, the configuration update may minimize impact to end users associated with the radio, and may mitigate negative experiences that the end users might encounter due to the radio's diminished performance. For example, the configuration update may reroute traffic or adjust handoff thresholds, which may reduce traffic load on the identified radio.

As further shown in FIG. 1E, and by reference number 160, the monitoring system 110 may determine, based on time and cost constraints, to replace the radio. For example, the monitoring system 110 may evaluate a severity of the KPI degradation for the identified radio and may consider operational factors, such as a time required and associated costs to replace the radio. If the monitoring system 110 determines that replacing the radio is justified and within budgetary and temporal allowances, the monitoring system 110 may cause the radio to be replaced (e.g., by dispatching a technician to replace the radio). The monitoring system 110 may determine to replace the radio based on a comprehensive analysis of factors, such as an age of the radio, a frequency of past incidents with the radio, insights from the trained predictive model, and/or the like.

Figure 1F:
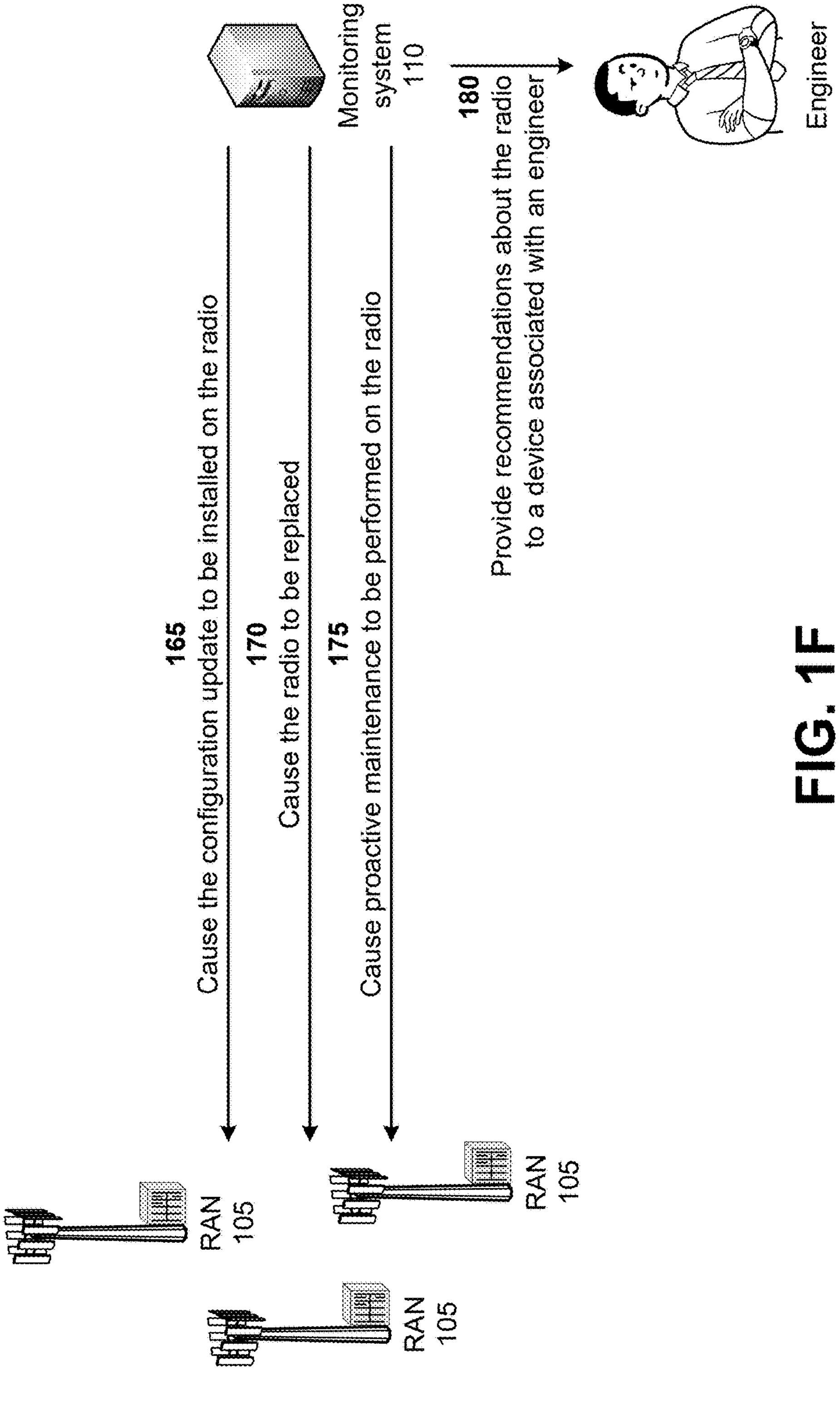

As shown in FIG. 1F, and by reference number 165, the monitoring system 110 may cause the configuration update to be installed on the radio. For example, the monitoring system 110 may provide the configuration update to the radio or to one or more RANs 105 associated with the radio (e.g., a RAN 105 that includes the radio and/or RANs 105 that provide traffic to the radio), and the radio or the one or more RANs 105 may receive the configuration update. The radio or the one or more RANs 105 may execute the configuration update to cause the configuration update to be installed on the radio and/or the one or more RANs 105. Alternatively, the monitoring system 110 may dispatch a technician or an autonomous vehicle to install the configuration update on the radio and/or the one or more RANs 105. The configuration update may minimize the impact on end users by rerouting traffic away from the radio or adjusting parameters of the radio, thus enhancing the robustness of the service provided by the radio. In some implementations, the configuration update may reduce traffic provided to the radio by the RANs 105.

As further shown in FIG. 1F, and by reference number 170, the monitoring system 110 may cause the radio to be replaced. For example, if the monitoring system 110 determines that replacing the radio is justified and within budgetary and temporal allowances (e.g., based on a comprehensive analysis of factors, such as an age of the radio, a frequency of past incidents with the radio, insights from the trained predictive model, and/or the like), the monitoring system 110 may cause the radio to be replaced. In some implementations, the monitoring system 110 may cause the radio to be replaced by dispatching a technician to replace the radio, by dispatching an autonomous vehicle to replace the radio, and/or the like.

As further shown in FIG. 1F, and by reference number 175, the monitoring system 110 may cause proactive maintenance to be performed on the radio. For example, the monitoring system 110 may identify maintenance that will enhance the performance of the radio and/or that will address issues identified by the predictive model before the issues escalate into more significant problems, thus preventing exacerbation of service degradation. The monitoring system 110 may cause the maintenance to be performed on the radio by dispatching a technician or an autonomous vehicle to perform the proactive maintenance on the radio. The proactive maintenance may significantly mitigate risks of severe outages impacting a considerable number of end users.

As further shown in FIG. 1F, and by reference number 180, the monitoring system 110 may provide recommendations about the radio to a device associated with an engineer. For example, the monitoring system 110 may generate recommendations to update the configuration of the radio, to replace the radio, to perform maintenance on the radio, and/or the like. The monitoring system 110 may provide the recommendations to a device associated with an engineer, and the engineer may view the recommendations. The engineer may determine whether to implement one or more of the recommendations. The recommendations may facilitate efficient and timely decision-making by the engineer.

In this way, the monitoring system 110 automatically updates RAN configurations in case of likely service degradation. For example, the monitoring system 110 may provide a proactive, automated system for mitigating potential service degradation in RANs 105 due to radio failures. The monitoring system 110 may monitor energy consumption patterns of radios, and may generate a connectivity graph for the RANs 105. The monitoring system 110 may apply a predictive machine learning model to anticipate energy drops, and may adjust network parameters to reroute traffic and avert service disruption. In some aspects, the monitoring system 110 may collect historical incident data and KPIs, and may apply preventive maintenance procedures for the radios and/or the RANs 105. The monitoring system 110 addresses the problem of reacting too late to service degradation by utilizing energy consumption patterns as an early warning sign. This allows the monitoring system 110 to proactively manage resource allocation and reroute traffic to preserve the integrity of RAN performance. By adjusting operational parameters, such as handover thresholds, the monitoring system 110 optimizes load distribution to reduce the impact on RAN resources due to potential radio failures. Additionally, the monitoring system 110 may utilize machine learning model recalibration based on actual energy consumption post-prediction, thereby enhancing predictive accuracy and conserving RAN resources through more precise anticipatory actions.

Thus, the monitoring system 110 may conserve computing resources, networking resources, and/or other resources that would have otherwise been consumed by handling poor end user experience associated with service degradation in RANs 105, failing to address the service degradation in RANs 105 in a timely manner resulting in service outages, handling lost traffic associated with the service degradation in RANs 105, and/or the like, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
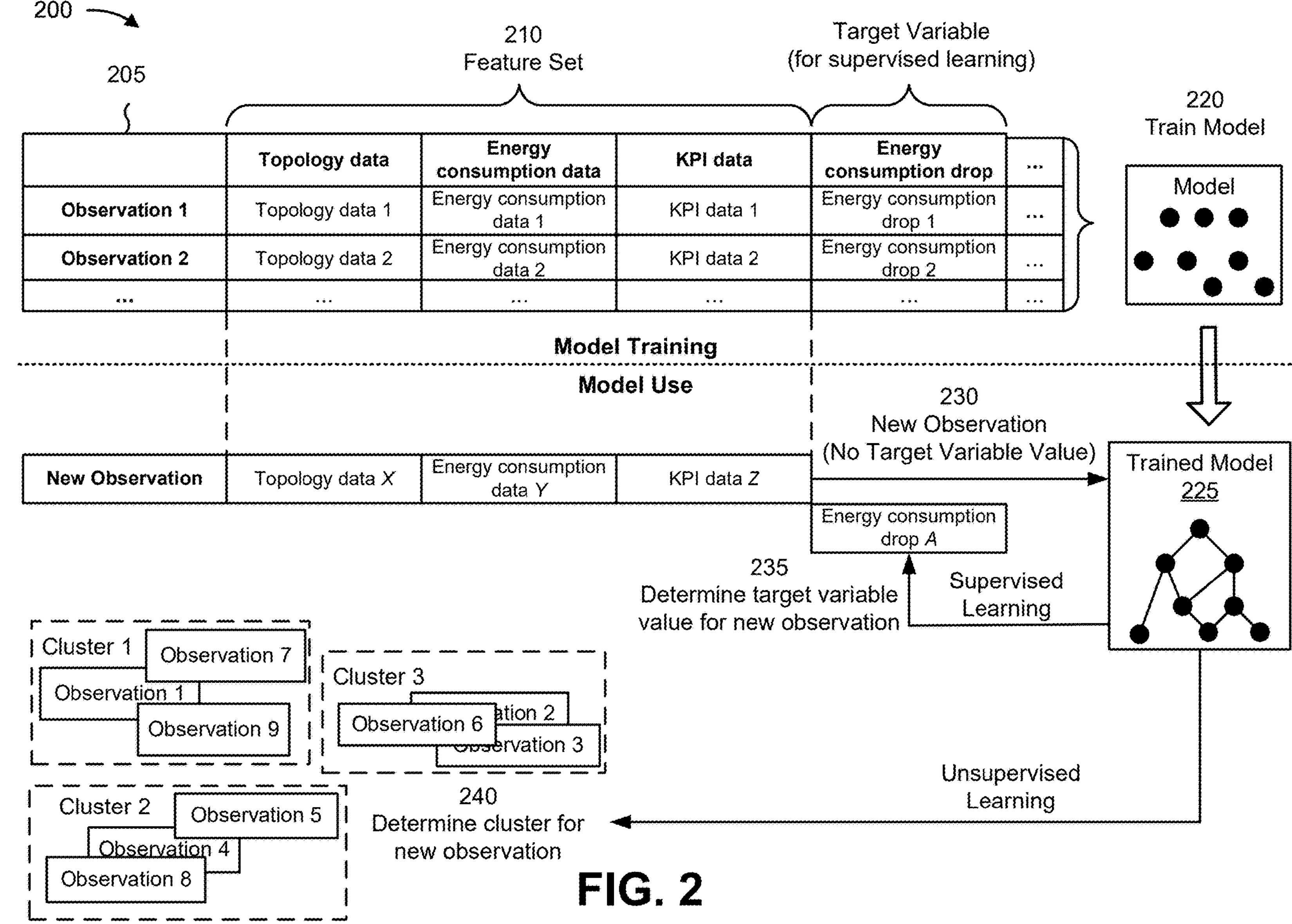
FIG. 2 is a diagram illustrating an example of training and using a machine learning model.

FIG. 2 is a diagram illustrating an example 200 of training and using a machine learning model for predicting an energy consumption drop of a radio and corresponding KPI degradation. The machine learning model training and usage described herein may be performed using a machine learning system. The machine learning system may include or may be included in a computing device, a server, a cloud computing environment, and/or the like, such as the monitoring system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the monitoring system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of topology data, a second feature of energy consumption data, a third feature of KPI data, and so on. As shown, for a first observation, the first feature may have a value of topology data 1, the second feature may have a value of energy consumption data 1, the third feature may have a value of KPI data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "energy consumption drop" and may include a value of energy consumption drop 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of topology data X, a second feature of energy consumption data Y, a third feature of KPI data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of energy consumption drop A for the target variable of the energy consumption drop for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a topology data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an energy consumption data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict an energy consumption drop of a radio and corresponding KPI degradation. The machine learning system enables recognition and/or identification of tens, hundreds, thousands, or millions of features and/or feature values for tens, hundreds, thousands, or millions of observations, thereby increasing accuracy and consistency and reducing delay associated with predicting an energy consumption drop of a radio and corresponding KPI degradation relative to requiring computing resources to be allocated for tens, hundreds, or thousands of operators to manually predict an energy consumption drop of a radio and corresponding KPI degradation.

As indicated above, FIG. 2 is provided as an example. Other examples may differ from what is described in connection with FIG. 2.

Figure 3:
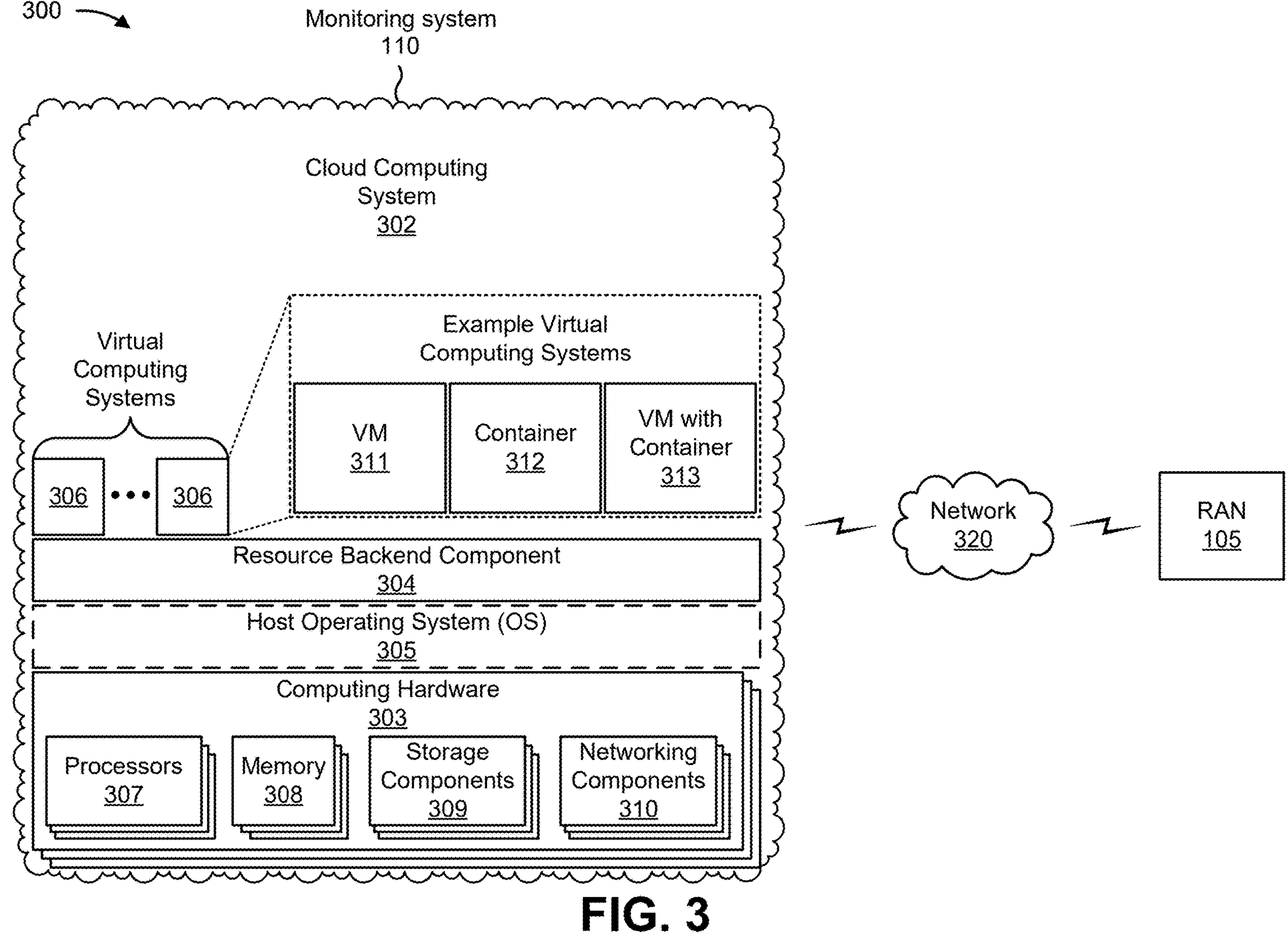
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the monitoring system 110, which may include one or more elements of and/or may execute within a cloud computing system 302. The cloud computing system 302 may include one or more elements 303-313, as described in more detail below. As further shown in FIG. 3, the environment 300 may include a RAN 105 and/or a network 320. Devices and/or elements of the environment 300 may interconnect via wired connections and/or wireless connections.

The RAN 105 may support, for example, a cellular radio access technology (RAT). The RAN 105 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment. The RAN 105 may transfer traffic between a user equipment (e.g., using a cellular RAT), one or more base stations (e.g., using a wireless interface or a backhaul interface, such as a wired backhaul interface), and/or a core network. The RAN 105 may provide one or more cells that cover geographic areas.

In some implementations, the RAN 105 may perform scheduling and/or resource management for a user equipment covered by the RAN 105 (e.g., a user equipment covered by a cell provided by the RAN 105). In some implementations, the RAN 105 may be controlled or coordinated by a network controller, which may perform load balancing, network-level configuration, and/or other operations. The network controller may communicate with the RAN 105 via a wireless or wireline backhaul. In some implementations, the RAN 105 may include a network controller, a self-organizing network (SON) module or component, or a similar module or component. In other words, the RAN 105 may perform network control, scheduling, and/or network management functions (e.g., for uplink, downlink, and/or sidelink communications of user equipment covered by the RAN 105).

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the monitoring system 110 may include one or more elements 303-313 of the cloud computing system 302, may execute within the cloud computing system 302, and/or may be hosted within the cloud computing system 302, in some implementations, the monitoring system 110 may not be cloud-based (e.g., may be implemented outside of a cloud computing system) or may be partially cloud-based. For example, the monitoring system 110 may include one or more devices that are not part of the cloud computing system 302, such as the device 400 of FIG. 4, which may include a standalone server or another type of computing device. The monitoring system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
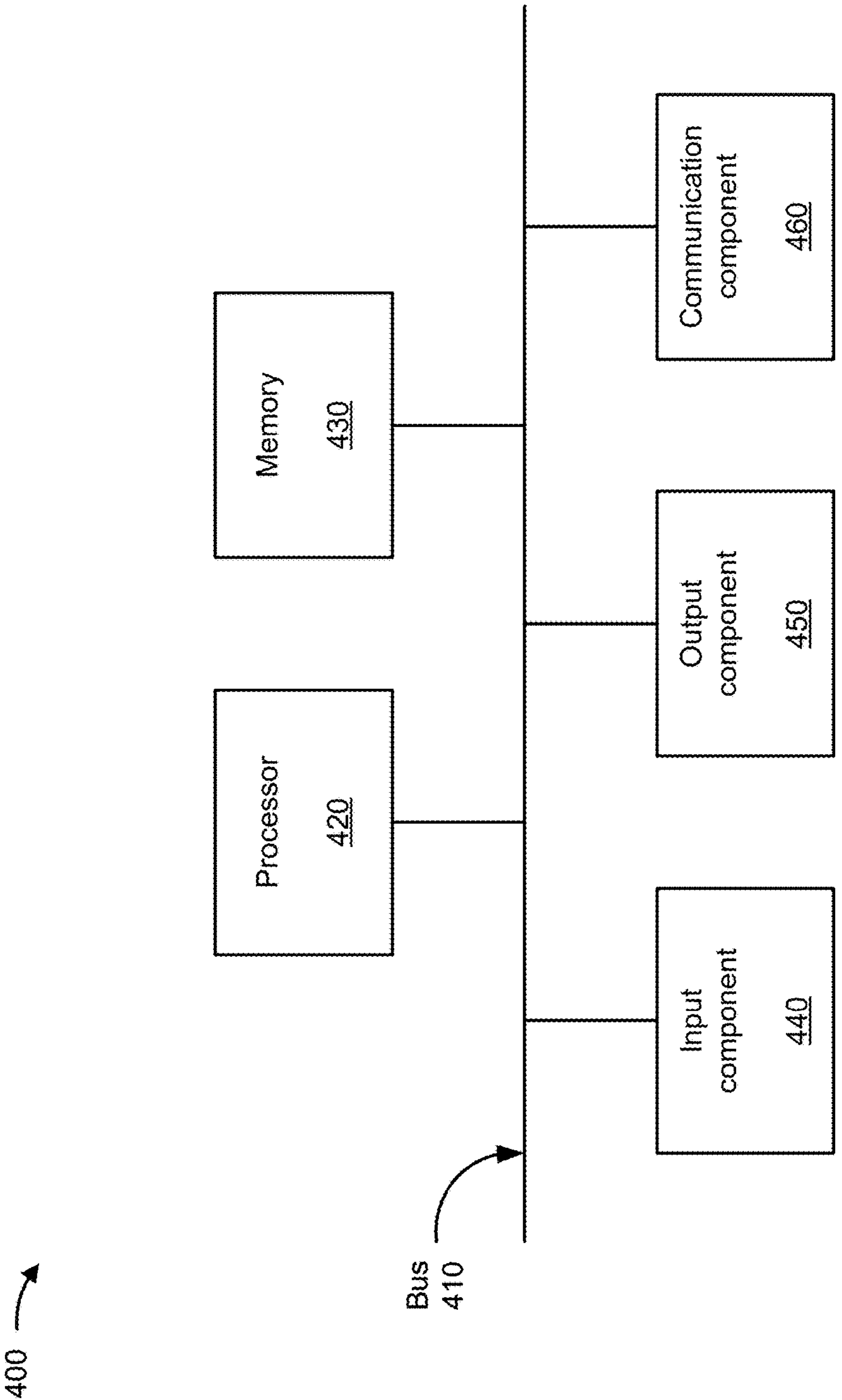
FIG. 4 is a diagram of example components of one or more devices of FIG. 3.

FIG. 4 is a diagram of example components of a device 400, which may correspond to the RAN 105 and/or the monitoring system 110. In some implementations, the RAN 105 and/or the monitoring system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
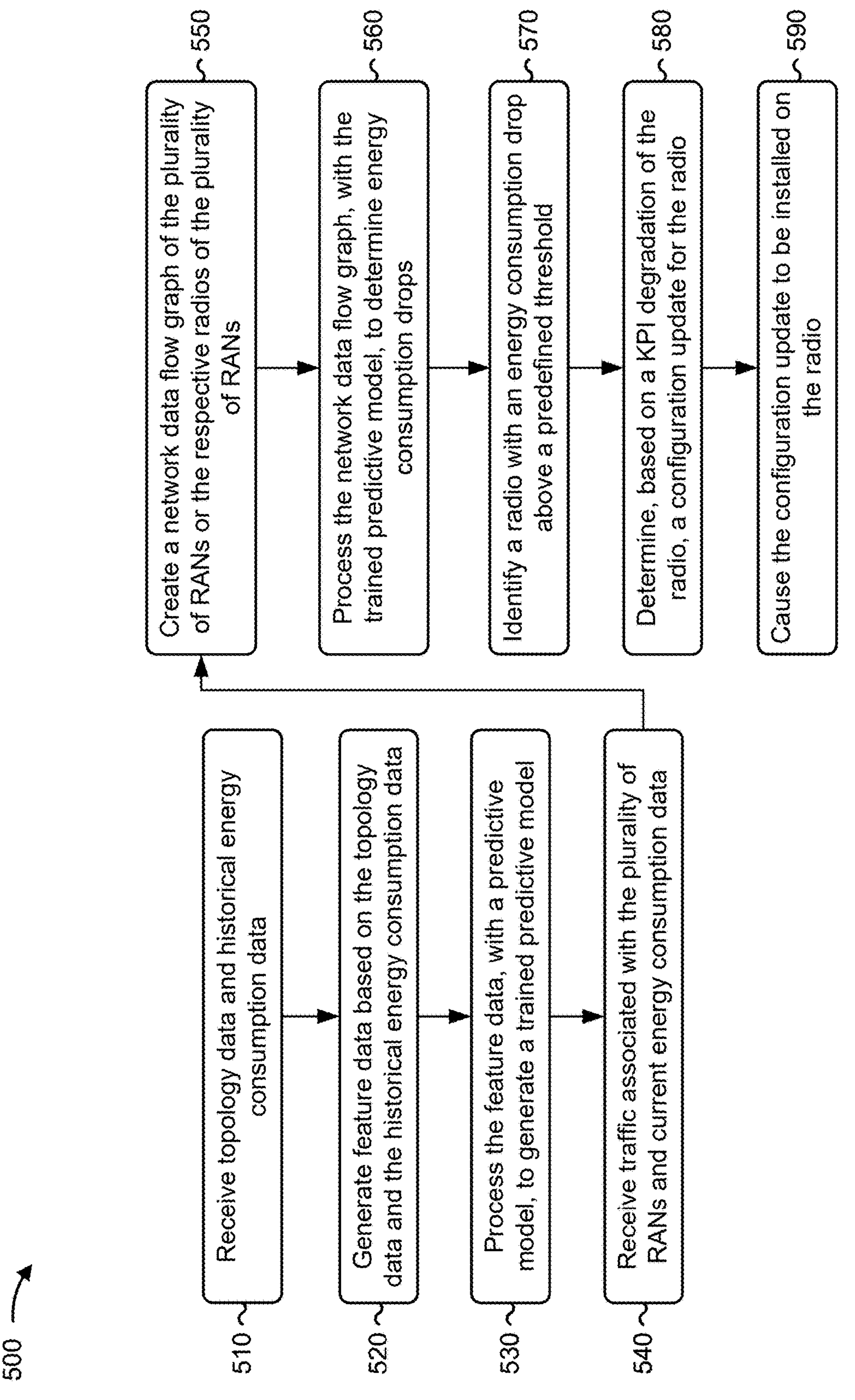
FIG. 5 is a flowchart of an example process for automatically updating RAN configurations in case of likely service degradation.

FIG. 5 is a flowchart of an example process 500 for automatically updating RAN configurations in case of likely service degradation. In some implementations, one or more process blocks of FIG. 5 may be performed by a device (e.g., the monitoring system 110). In some implementations, one or more process blocks of FIG. 5 may be performed by another device or a group of devices separate from or including the device, such as a RAN (e.g., the RAN 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving topology data and historical energy consumption data (block 510). For example, the device may receive topology data associated with a plurality of RANs and historical energy consumption data associated with respective radios of the plurality of RANs, as described above.

As further shown in FIG. 5, process 500 may include generating feature data based on the topology data and the historical energy consumption data (block 520). For example, the device may generate feature data identifying features based on the topology data and the historical energy consumption data, as described above.

As further shown in FIG. 5, process 500 may include processing the feature data, with a predictive model, to generate a trained predictive model (block 530). For example, the device may process the feature data, with a predictive model, to generate a trained predictive model that predicts energy consumption drops of the respective radios and corresponding KPI degradations, as described above. In some implementations, the predictive model includes a predictive regression model or a binary classification model.

As further shown in FIG. 5, process 500 may include receiving traffic associated with the plurality of RANs and current energy consumption data (block 540). For example, the device may receive traffic associated with the plurality of RANs and current energy consumption data associated with the respective radios of the plurality of RANs, as described above. In some implementations, receiving the traffic associated with the plurality of RANs and the current energy consumption data associated with the respective radios of the plurality of RANs includes receiving the traffic associated with the plurality of RANs and the current energy consumption data associated with the respective radios of the plurality of RANs for a predetermined quantity of hours.

As further shown in FIG. 5, process 500 may include creating a network data flow graph of the plurality of RANs or the respective radios of the plurality of RANs (block 550). For example, the device may create a network data flow graph of the plurality of RANs or the respective radios of the plurality of RANs based on the traffic and the current energy consumption data, as described above. In some implementations, the network data flow graph includes nodes representing the plurality of RANs or the respective radios of the plurality of RANs and edges representing traffic flow between the nodes. In some implementations, creating the network data flow graph includes creating, for the network data flow graph, nodes representing the plurality of RANs or the respective radios of the plurality of RANs, creating, for the network data flow graph, edges representing traffic flow between the nodes, and assigning weight values to the edges of the network data flow graph based on traffic volume.

As further shown in FIG. 5, process 500 may include processing the network data flow graph, with the trained predictive model, to determine energy consumption drops (block 560). For example, the device may process the network data flow graph, with the trained predictive model, to determine energy consumption drops of the respective radios and corresponding KPI degradations of the respective radios, as described above.

As further shown in FIG. 5, process 500 may include identifying a radio with an energy consumption drop above a predefined threshold (block 570). For example, the device may identify a radio of the respective radios and with an energy consumption drop above a predefined threshold, as described above.

As further shown in FIG. 5, process 500 may include determining, based on a KPI degradation of the radio, a configuration update for the radio (block 580). For example, the device may determine, based on a KPI degradation of the radio, a configuration update for the radio to minimize impact to end users associated with the radio, as described above. In some implementations, the configuration update reduces traffic provided to the radio, compared to traffic received by the radio prior to the configuration update.

As further shown in FIG. 5, process 500 may include causing the configuration update to be installed on the radio (block 590). For example, the device may cause the configuration update to be installed on the radio, as described above.

In some implementations, process 500 includes determining, based on time and cost constraints, to replace the radio, and causing the radio to be replaced based on determining to replace the radio. In some implementations, process 500 includes causing proactive maintenance to be performed on the radio. In some implementations, process 500 includes providing recommendations about the radio to another device associated with an engineer.

In some implementations, process 500 includes retraining the predictive model based on post-prediction analysis of actual energy consumption by the radio. In some implementations, process 500 includes implementing alternative node configurations to maintain robust network service when the radio is offline. In some implementations, process 500 includes simulating potential traffic scenarios in the plurality of RANs to refine rerouting strategies. In some implementations, process 500 includes receiving updated traffic associated with the plurality of RANs and updated current energy consumption data associated with the respective radios of the plurality of RANs, and updating the network data flow graph based on the updated traffic and the updated current energy consumption data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, topology data associated with a plurality of radio access networks (RANs) and historical energy consumption data associated with respective radios of the plurality of RANs;

generating, by the device, feature data identifying features based on the topology data and the historical energy consumption data;

processing, by the device, the feature data, with a predictive model, to generate a trained predictive model that predicts energy consumption drops of the respective radios and corresponding key performance indicator (KPI) degradations;

receiving, by the device, traffic associated with the plurality of RANs and current energy consumption data associated with the respective radios of the plurality of RANs;

creating, by the device, a network data flow graph of the plurality of RANs or the respective radios of the plurality of RANs based on the traffic and the current energy consumption data;

processing, by the device, the network data flow graph, with the trained predictive model, to determine energy consumption drops of the respective radios and corresponding KPI degradations of the respective radios;

identifying, by the device, a radio of the respective radios and with an energy consumption drop above a predefined threshold;

determining, by the device and based on a KPI degradation of the radio, a configuration update for the radio to minimize impact to end users associated with the radio; and causing, by the device, the configuration update to be installed on the radio.

2. The method of claim 1, further comprising:

determining, based on time and cost constraints, to replace the radio; and causing the radio to be replaced based on determining to replace the radio.

3. The method of claim 1, further comprising:

causing proactive maintenance to be performed on the radio.

4. The method of claim 1, further comprising:

providing recommendations about the radio to another device associated with an engineer.

5. The method of claim 1, wherein receiving the traffic associated with the plurality of RANs and the current energy consumption data associated with the respective radios of the plurality of RANs comprises:

receiving the traffic associated with the plurality of RANs and the current energy consumption data associated with the respective radios of the plurality of RANs for a predetermined quantity of hours.

6. The method of claim 1, wherein the configuration update reduces traffic provided to the radio, compared to traffic received by the radio prior to the configuration update.

7. The method of claim 1, wherein the predictive model includes a predictive regression model or a binary classification model.

8. A device, comprising:

one or more processors configured to:

receive topology data associated with a plurality of radio access networks (RANs) and historical energy consumption data associated with respective radios of the plurality of RANs;

generate feature data identifying features based on the topology data and the historical energy consumption data;

process the feature data, with a predictive model, to generate a trained predictive model that predicts energy consumption drops of the respective radios and corresponding key performance indicator (KPI) degradations;

receive traffic associated with the plurality of RANs and current energy consumption data associated with the respective radios of the plurality of RANs;

create a network data flow graph of the plurality of RANs or the respective radios of the plurality of RANs based on the traffic and the current energy consumption data;

process the network data flow graph, with the trained predictive model, to determine energy consumption drops of the respective radios and corresponding KPI degradations of the respective radios;

identify a radio of the respective radios and with an energy consumption drop above a predefined threshold; and perform one or more actions for the radio with the energy consumption drop above the predefined threshold.

9. The device of claim 8, wherein the network data flow graph includes nodes representing the plurality of RANs or the respective radios of the plurality of RANs and edges representing traffic flow between the nodes.

10. The device of claim 8, wherein the one or more processors, to create the network data flow graph, are configured to:

create, for the network data flow graph, nodes representing the plurality of RANs or the respective radios of the plurality of RANs;

create, for the network data flow graph, edges representing traffic flow between the nodes; and assign weight values to the edges of the network data flow graph based on traffic volume.

11. The device of claim 8, wherein the one or more processors are further configured to:

retrain the predictive model based on post-prediction analysis of actual energy consumption by the radio.

12. The device of claim 8, wherein the one or more processors are further configured to:

implement alternative node configurations to maintain robust network service when the radio is offline.

13. The device of claim 8, wherein the one or more processors are further configured to:

simulate potential traffic scenarios in the plurality of RANs to refine rerouting strategies.

14. The device of claim 8, wherein the one or more processors are further configured to:

receive updated traffic associated with the plurality of RANs and updated current energy consumption data associated with the respective radios of the plurality of RANs; and update the network data flow graph based on the updated traffic and the updated current energy consumption data.

15. A non-transitory computer-readable medium storing a set of instructions, the set of instructions comprising:

one or more instructions that, when executed by one or more processors of a device, cause the device to:

receive traffic associated with a plurality of radio access networks (RANs) and current energy consumption data associated with respective radios of the plurality of RANS;

create a network data flow graph of the plurality of RANs or the respective radios of the plurality of RANs based on the traffic and the current energy consumption data;

process the network data flow graph, with a predictive model, to determine energy consumption drops of the respective radios and corresponding KPI degradations of the respective radios;

identify a radio of the respective radios and with an energy consumption drop above a predefined threshold; and perform one or more actions for the radio with the energy consumption drop above the predefined threshold.

16. The non-transitory computer-readable medium of claim 15, wherein the one or more instructions, that cause the device to perform the one or more actions, cause the device to one or more of:

cause a configuration update to be installed on the radio;

cause the radio to be replaced;

cause proactive maintenance to be performed on the radio; or provide recommendations about the radio to another device associated with an engineer.

17. The non-transitory computer-readable medium of claim 15, wherein the one or more instructions, that cause the device to receive the traffic associated with the plurality of RANs and the current energy consumption data associated with the respective radios of the plurality of RANs, cause the device to:

receive the traffic associated with the plurality of RANs and the current energy consumption data associated with the respective radios of the plurality of RANs for a predetermined quantity of hours.

18. The non-transitory computer-readable medium of claim 15, wherein the network data flow graph includes nodes representing the plurality of RANs or the respective radios of the plurality of RANs and edges representing traffic flow between the nodes.

19. The non-transitory computer-readable medium of claim 15, wherein the one or more instructions, that cause the device to create the network data flow graph, cause the device to:

create, for the network data flow graph, nodes representing the plurality of RANs or the respective radios of the plurality of RANs;

create, for the network data flow graph, edges representing traffic flow between the nodes; and assign weight values to the edges of the network data flow graph based on traffic volume.

20. The non-transitory computer-readable medium of claim 15, wherein the one or more instructions further cause the device to:

receive updated traffic associated with the plurality of RANs and updated current energy consumption data associated with the respective radios of the plurality of RANs; and update the network data flow graph based on the updated traffic and the updated current energy consumption data.

* * * * *